Patented June 17, 1952

2,600,449

UNITED STATES PATENT OFFICE 2,600,449

MALEIC ACRYLIC COPOLYMERS

William L. Van Horne and La Verne N. Bauer, Philadelphia, and Harry T. Neher, Bristol, Pa., assignors to Rohm & Haas Company, Philadelphia, Pa., a corporation of Delaware No Drawing. Application January 17, 1950, Serial No. 139,132

5 Claims. (Cl. 260—78.5)

This invention deals with copolymers of maleinoid esters (A) from a saturated aliphatic monohydric alcohol, ROH, in which R is an alkyl group having a carbon chain of 16 to 18 carbon atoms and an unsaturated dibasic acid,

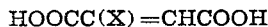

$$HOOCC(X)=CHCOOH$$

where X is hydrogen, chlorine, or the methyl group, and an acrylic ester (B) from acrylic acid and an alcohol, R'OH, in which R' is an alkyl group of 6 to 14 carbon atoms and preferably 10 to 14 carbon atoms, the two types of esters, A and B, being copolymerized within the proportions herein set forth. This invention also deals with solutions of the defined copolymers in wax-containing oils in amounts sufficient to depress the pour points thereof.

Solutions of various resinous materials in hydrocarbon fluids have been proposed for a number of purposes, such as to increase the body or viscosity of the fluids, to improve the temperature-viscosity relationships, or to lower the pour point of a fluid. This last effect has not been a predictable one. In some cases pour points of oils remain unchanged when a resinous or polymeric material is dissolved therein. In other cases pour points are raised. Lowering of pour points can, however, be attained with a limited number of polymeric products including those here defined.

This effect is not observed when polymers of pure individual components are used. For example, we find that polymers of dihexyl maleate, dihexyl fumarate, dioctyl itaconate, didecyl maleate, dicetyl maleate, dioctadecyl fumarate, or the like, or nonyl acrylate, hexyl acrylate, octyl acrylate, cetyl acrylate or stearyl acrylate, do not depress the pour points of waxy lubricating oils. Neither do mechanical mixtures of two or more of such polymers accomplish this desirable result. We have found, however, that the copolymers here defined are of considerable value for this purpose.

The component esters which enter into the copolymers of this invention are on the one hand maleinoid esters and on the other hand acrylic esters. The former must have as their ester-forming group derived from an alcohol an alkyl group with a straight chain of 16 to 18 carbon atoms. There may thus be taken dicetyl or distearyl maleate, fumarate, chloromaleate, citraconate, or mesaconate, or mixtures of such esters, or mixed esters with two such alkyl groups, such as cetyl stearyl maleate. The esters may be derived from pure cetyl alcohol, heptadecyl alcohol, or octadecyl alcohol, or from commercial products which are chiefly cetyl and stearyl alcohols. The acrylate contains as the alcohol residue an alkyl group of 6 to 14 carbon atoms. This group may have a straight or branched chain. Useful alkyl groups include hexyl, heptyl, octyl, nonyl, decyl, dodecyl, and tetradecyl in their various isomeric forms. Some important groups are 2-ethylhexyl, capryl, 3,5,5-trimethylhexyl, 5,7-dimethyloctyl, 5,5,-dimethylhexyl, 5,7,9-trimethyldecyl, 5,7,7-trimethyloctyl, n-decyl, n-dodecyl, n-tetradecyl, etc. The chain lengths of these groups determine the upper and lower proportions of acrylic esters which can be used with the maleinoid ester to give copolymers having the capacity to lower pour points of oils.

About the maximum proportion of acrylic ester which may be used per mole of maleinoid ester is defined by the ratio $2n:1$ where $n$ is the number of carbon atoms in the longest chain of the alkyl group of the acrylic ester. Thus, there may be copolymerized as many as 12 moles of hexyl acrylate with one mole of dicetyl or distearyl maleate. As many as 24 moles of dodecyl acrylate may be copolymerized with one mole of such maleate or its equivalent. Similarly in the case of n-octyl acrylate the ratio may be as high as 16:1. But with 2-ethylhexyl acrylate the maximum ratio is 12:1. This rule holds well except for the alkyl acrylates of about maximum length, for which esters both upper and lower limits are not sharp.

The lower limit for the proportion of acrylic ester which can be used to give pour-depressing copolymers also depends on the number of carbon atoms in the longest carbon chain of the alkyl group of this ester. In the case of hexyl acrylate it was found that at least six moles of this acrylate were necessary per mole of long-chained maleate or its equivalent. About three and a third moles of octyl acrylate were found needed, over two moles of decyl acrylate, and over one mole of myristyl acrylate. From these data it is found that the lower proportion of acrylic ester is defined by the ratio $X:1$, where $X=6^3/n^2$ where $n$ is the number of carbon atoms in the longest chain of the alkyl group of the acrylic ester.

Copolymerization of the two types of esters is carried out by mixing in proper proportion, extending the mixture with an inert organic solvent, adding a polymerization catalyst, and heating to carry copolymerization to a useful molecular size. The copolymer may be prepared in a volatile solvent and then taken up in an oil by mixing copolymer solution and oil and evaporating the solvent. Concentrated solutions in oil are particularly useful for treating lubricating oils.

Suitable catalysts for effecting copolymerization are peroxides and acyclic azo compounds, such as azodiisobutyronitrile. A single peroxide may be added to the mixture to be copolymerized or a mixture of such catalysts may be used. The catalysts are preferably added in relatively small amounts as copolymerization proceeds. Suitable peroxides include acetyl peroxide, caproyl peroxide, lauroyl peroxide, benzoyl peroxide, dibenzal peroxide, di-tert.-butyl diperphthalate, tert.-butyl perbenzoate, 2,2-bis(tert.-butylperoxy)butane, methyl ethyl ketone peroxide, di-tert.-butyl peroxide, tert.-butylhydroperoxide, etc. Amounts of 2.5% to 15% of catalyst, based on weight of monomers, may be used. A range of 1% to 6% may be used at the start of the copolymerization reaction and small amounts added at intervals as this reaction progresses.

Solvent may also be added from time to time. It is practically essential to use enough solvent to keep in solution all of the copolymer as it forms. If copolymer separates, or if a gel is allowed to form, the copolymer is usually found unsuitable.

Copolymerization is effected usually within the range of 70° C. and 150° C. One temperature level may be used at the start of copolymerization and another as copolymerization advances. The variables, such as temperature, solvent, concentration, choice of catalyst, time, and so on are so selected and controlled as to give oil-soluble copolymers which have a molecular size suitable for the intended application. Copolymers with apparent molecular weights from about 1000 up to 20,000 to 50,000 can be prepared. The relatively large proportion of acrylic units is favorable to reaching large molecular sizes. Such copolymers have not only pour depressing action but provide also improvements in viscosity index.

Additional details in regard to the preparation of copolymers of this invention will be found in the illustrative examples which follow.

Example 1

A reaction vessel was used equipped with a stirrer, a reflux condenser, a thermometer, an inlet tube for admitting nitrogen, and a funnel for adding materials. The vessel was heated by an oil bath. A mixture was made from 594 parts by weight of distearyl maleate (prepared from a commercial stearyl alcohol having a octadecyl content of about 90%), 1406 parts by weight of n-hexyl acrylate, 2100 parts of toluene, and 40 parts of benzoyl peroxide. This mixture was run into the reaction vessel during the course of 1.6 hours which was maintained at 120°–122° C. At 2.75 hours 16 parts of benzoyl peroxide and 80 parts of toluene were added and the temperature was held at 120° C. until four hours had elapsed, at which time it was permitted to drop slowly to about 105° C. At 4.5 hours 40 parts of the peroxide and 80 parts of solvent were added. Additions of 16 parts of peroxide and 6 parts of peroxide, each in 80 parts of toluene were made at 5.5 and 6.5 hours, respectively. Heating was discontinued at 7.5 hours. There was thus obtained a 49.3% solution of copolymer in toluene. A 30% solution of this copolymer in toluene had a viscosity of 5.4 centistokes at 100° F.

The copolymer was transferred to a light oil by mixing 300 parts of the toluene solution with 225 parts of the oil and heating and stirring the mixture under gradually reduced pressure. Final stripping was accomplished at 140° C. at 2 mm. The oil solution contained 38.9% of copolymer. It is useful for addition to wax-containing oils to reduce the pour point thereof.

Example 2

There was placed in the reaction vessel a mixture of 19 parts of dioctadecyl fumarate, 38 parts of an alkyl acrylate in which the alkyl groups averaged 14 carbon atoms in branched chain arrangement, being the residue of alcohols derived from a cut of olefines of corresponding molecular size, 60 parts of toluene, and 1.5 parts of benzoyl peroxide. While the reaction vessel was heated between 112° and 120° C., there was slowly added a solution of 39 parts of the tetradecyl acrylate and 1 part of benzoyl peroxide in 80 parts of toluene. Additions of catalyst were made as follows: at 3 hours, 1 part; at 4.5 hours, 2.5 parts; at 5.3 hours, 1 part; at 6.3 hours, 0.4 part. Toluene was added at 7.3 hours in an amount of 110 parts. At 4.3 hours the temperature was lowered to 104° C. and maintained at about this level until 7.75 hours. The product was a 28.8% solution of copolymer. A 25% solution in toluene had a viscosity of 3.9 centistokes at 100° F.

The toluene solution was mixed with a light lubricating oil. The mixture was heated to 140° C./1 mm. to give an oil solution containing 37.8% of copolymer. This copolymer was found exceptionally effective in reducing pour points of wax-containing oils.

Example 3

A mixture was made of 19 parts of distearyl citraconate, 81 parts of dodecyl acrylate (from a commercial straight-chained dodecyl alcohol having a $C_{12}$ alcohol content of about 85%), 120 parts of toluene, and 1.5 parts of benzoyl peroxide. It was charged to the reaction vessel during a period of two hours with the temperature of the vessel held at 116°–120° C. Catalyst was added as follows: at 3 hours, 0.6 part; at 4.75 hours, 1.5 parts; at 5.75 hours, 0.6 part; and at 6.75 hours, 0.2 part. Toluene was added at the same time in increments of 8 parts each, and at 7.5 hours, 70 parts of toluene was added. After 4.25 hours of heating at about 120° C. the temperature was reduced to about 105° C. and held at this level until heating was discontinued at 7.5 hours. The product was a 32.8% solution of copolymer, which when reduced with toluene to 30% concentration had a viscosity of 11.0 centistokes at 100° F. This copolymer was highly effective as an oil additive for depressing pour points of oils having waxy-pour points.

Repetition of the above preparation with substitution of dioctadecyl mesaconate for the citraconate yields a very similar copolymer which is also highly effective as a pour point depressant.

Example 4

A mixture of 297 parts of dicetyl maleate, 703 parts of myristyl acrylate, 1400 parts of a close-cut aromatic naphtha, and 50 parts of benzoyl peroxide was stirred and heated at 120° C. for four hours and at 105° C. for 3.5 hours. Additions of the peroxide catalyst were made four times for a total of 98 parts. Four additions of toluene amounted in all to 550 parts. The product was a 43.5% solution of copolymer in toluene. A 30% solution was found to have a viscosity of 11.3 centistokes at 100° F. This copolymer was found an efficient pour point depressant.

Example 5

A mixture of 300 parts of dioctadecyl maleate, 700 parts of n-octyl acrylate, 1000 parts of toluene, and 14 parts of azodiisobutyronitrile was stirred and heated at 120° C.–123° C. for 4.5 hours and then at 106°–103° C. for 3 hours. Additions of catalyst were made from time to time totaling 27 parts. Solvent was also added to a total of 450 parts. The product was a 45.8% solution of copolymer in toluene. At 30% in toluene the viscosity was 3.2 centistokes at 100° F. This copolymer was transferred to a lubricating oil by the procedure previously described. It was found effective in depressing the pour points of waxy oils.

A similar copolymer was prepared with substitution of benzoyl peroxide for the above catalyst. It, too, proved effective in reducing pour points of oils.

*Example 6*

A mixture of 57 parts of a mixed maleate prepared from a mixture of 80% stearyl alcohol and 20% dodecyl alcohol, 143 parts of *n*-octyl acrylate, 210 parts of toluene, and 50 parts of benzoyl peroxide was heated as above for 1.67 hours at 120° C. and for 6 hours at 100°–105° C. Additions of catalyst amounted to 98 parts and of toluene to 190 parts. The product obtained contained 30.6% of copolymer. A 30% solution of copolymer in toluene had a viscosity of 5.6 centistokes at 100° F.

*Example 7*

By the procedures already discussed in detail there were mixed 40 parts of dioctadecyl maleate, 160 parts of a tridecyl acrylate (the tridecyl group being obtained from a branched chained alcohol prepared from olefines by the "oxo" process), 200 parts in all of toluene, and 29.6 parts in all of benzoyl peroxide. The product was a 46.3% solution of copolymer in toluene. A 30% solution had a viscosity of 6.6 centistokes at 100° F. This copolymer effectively lowered the pour point of oils having a waxy pour point.

*Example 8*

A copolymer was formed from one mole of dicetyl maleate and six moles of 3,5,5-trimethylhexyl acrylate by the above procedures. A 30% solution of the copolymer in toluene had a viscosity of 108 centistokes at 100° F. It depressed the pour point of a typical waxy-oil.

A copolymer prepared as above from one mole of dicetyl maleate and three moles of 3,5,5-trimethylhexyl acrylate did not lower the pour point of this oil.

*Example 9*

A copolymer from 50.4 parts of dioctadecyl chloromaleate and 49.6 parts of octyl acrylate was prepared by the procedures detailed above. The product was a 39.9% solution of copolymer in toluene. A 30% solution of the copolymer in toluene had a viscosity of 6.7 centistokes at 100° F. This copolymer is effective in depressing the pour points of waxy oils.

Copolymers which are effective pour point depressants are also prepared by forming a heteropolymer of a maleinoid acid or anhydride and an acrylic ester within the ratios defined above for the esters and esterifying the acid groups of the heteropolymer with a long chained monohydric aliphatic alcohol.

The effect on the pour point of wax-containing hydrocarbons was determined by dissolving a defined copolymer in such hydrocarbon fluid in an amount sufficient to depress the pour point and subjecting the resulting solution to the A. S. T. M. pour test (D97–47). In some instances, this test was supplemented or replaced with shock chilling and/or maximum pour tests. Cf. Proc. A. S. T. M. 45, appendix I, p. 244 (1945). The shock chilling determination is made by observing the sample during the initial cooling step with the cooling jacket at −60° F.

The useful range for using the copolymers of this invention in hydrocarbon fluids is from a concentration of about 0.01% up to about 5%. In any case, the amount of copolymer dissolved in a hydrocarbon of waxy pour point should be sufficient to depress the normal pour point of the said hydrocarbon.

For the evaluation of the copolymers three oils were selected. One was a 150 Pennsylvania neutral having a pour point of +25° F. (oil I). This was an oil which proved to be relatively sensitive to the action of pour point depressants. The second oil (oil II) was selected to study effects in heavy oils. It was an S. A. E. 90 gear oil, compounded from 30 parts of a 180 Pennsylvania neutral and 70 parts of a 150 Pennsylvania bright stock. It had a pour point also of +25° F. A third oil (oil III) was a 500 Mid-Continent solvent-extracted neutral (S. A. E. 30) having a pour point of +25° F. This was known to be an oil which was not readily changed as to its pour point.

A copolymer from dioctadecyl maleate and hexyl acrylate in a 1:7 mole ratio was dissolved at 0.5% in oil I. The pour point of the solution was 0° F. At 0.25% concentration the pour point was also 0° F.

A copolymer from the same esters but in a mole ratio of 1:12 likewise caused the pour point to be 0° F. in oil I. A copolymer from these two esters at 1:14 mole ratio failed to depress the pour point of oil I.

A copolymer from dioctadecyl maleate and n-octyl acrylate in a 1:4 mole ratio in oil I gave pour points of −5° F. at 0.5% and 0° F. at 0.25%. In oil III at 0.5% it depressed the pour point to −10° F.

A polymer of n-octyl acrylate was dissolved at 0.5% in oil I. This solution had a pour point of +25° F. A 0.5% solution of dioctadecyl maleate in oil I had a pour point of +30° F. A mechanical mixture of polymeric octyl acrylate and polymeric dioctadecyl maleate was prepared in a mole ratio of 7.5:1 of the two types of polymers. A solution of 0.5% of this mixture was dissolved in oil I. The pour point then was +30° F.

A copolymer made from the monomers used above was made from one mole of dioctadecyl maleate and 7.5 moles of n-octyl acrylate. This copolymer in oil I at 0.5% gave a pour point of −15° F. and at 0.25% gave a pour point of −10° F.

A copolymer from dioctadecyl maleate and n-decyl acrylate in a 1:20 mole ratio gave a pour point of −35° F. in oil I at 0.5% and 0° F. in oil I at 0.25%. In oil III at 0.5% the pour point was −10° F.

A copolymer from dioctadecyl maleate and n-decyl acrylate in a 1:2.5 mole ratio gave a pour point of −10° F. in oil I at 0.5%. A copolymer but from a 1:1 mole mixture of the same esters gave a pour point of +25° F. in oil I at 0.5%.

A copolymer from dioctadecyl maleate and n-dodecyl acrylate in a 1:2 mole ratio depressed the pour point of oil I 30° F. at a concentration of 0.5%. A copolymer from the same esters in a 1:1 mole ratio depressed the pour point 15° F. at 0.5% in oil I. A copolymer from the same esters in a 1:10 mole ratio depressed the pour point 50° F. at 0.5% and 45° F. at 0.25%. In oil II it depressed the pour point 20° F. at 0.1%. In oil III it depressed the pour point 40° F. and gave a maximum pour point of 0° F. A copolymer from the same esters in a 1:20 mole ratio depressed the pour point 50° F. at 0.5% and 0.25% and 40° F. at 0.1%. In oil III the pour point was depressed 40° F. at 0.5%. The maximum pour point was —5° F.

A copolymer from dioctadecyl fumarate and dodecyl acrylate in a 1:5 mole ratio gave a pour point of —30° F. at 0.5% in oil I and of —20° F. at 0.25% in oil I.

A copolymer from dioctadecyl citraconate and dodecyl acrylate in a 1:12 mole ratio caused a depression of 45° F. in oil I at 0.5% and 0.25%, and 30° F. at 0.1%, and 25° F. at 0.04%. In oil II at 0.1% this copolymer caused a depression of 15° F. In oil III at 0.5% the depression was 35° F. at 0.5%. The maximum pour test was —5° F.

A copolymer from dioctadecyl mesaconate and dodecyl acrylate in a 1:12 mole ratio gave a depression of 40° F. in oil I at 0.5% and 35° F. in oil I at 0.25%.

A copolymer from dioctadecyl chloromaleate and dodecyl acrylate in a 1:12 mole ratio gave a depression of 40° F. at 0.5% and 0.25% in oil I. In oil III it lowered the pour point to —10° F. at 0.5%.

A copolymer from dioctadecyl maleate and octyl thioacrylate in a 1:10 mole ratio gave a pour point of —5° F. for oil I with 0.5% of copolymer.

A copolymer from dihexadecyl maleate and dodecyl acrylate in a 1:15 mole ratio caused the pour point of oil I to be depressed to —20° F. at 0.5% concentration, to —20° F. at 0.25%, and to 0° F. at 0.1%. In oil III the pour point was lowered to —15° F. at 0.5% concentration. A copolymer from the same esters in a 1:24 mole ratio gave pour points of —15° F. at 0.04% in oil I, +5° F. at 0.1% in oil II, and —10° F. in oil III at 0.5%.

A copolymer from dihexadecyl maleate and tetradecyl acrylate in a 1:1.2 mole ratio gave a pour point of +5° F. for oil I with 0.5% of copolymer. A copolymer from the same esters in 1:10 mole ratio gave pour points of 0° F. at 0.5%, 0.25%, 0.1%, and 0.04% in oil I and +5° F. at 0.5% in oil III.

A copolymer from dihexadecyl fumarate and dodecyl acrylate in a 1:20 mole ratio depressed the pour point of oil I to —20° F. at 0.5% and 0.25%.

A copolymer of didodecyl fumarate and dodecyl acrylate in a 1:2 mole ratio failed to lower the pour point of oil II or oil III.

The copolymers of this invention depress the pour point of oils with little if any dependence on molecular size. When, however, they are used to impart increased viscosity or to improve the viscosity index of oils, they need to have a molecular weight of at least 5,000. A copolymer of dioctadecyl maleate and dodecyl acrylate in a mole ratio of 1:20 was prepared to have a molecular size which imparted to a 30% solution in toluene a viscosity of 160 centistokes at 100° F. A 0.5% solution of this copolymer in oil I had viscosities of 5.70 centistokes at 210° F. and 34.4 centistokes at 100° F. This corresponds to a viscosity index of 115.9. The original oil had a viscosity of 5.15 centistokes at 210° F. and 30.9 centistokes at 100° F. corresponding to a viscosity index of 106.9 A 2% solution in oil I had a viscosity index of 132.6, the viscosity at 210° F. being 7.46 centistokes.

The copolymers of this invention are new. They are characterized by their solubility in hydrocarbon fluids and their capacity for imparting thereto an increase in viscosity which is coupled with some improvement in viscosity index and lowering of pour point when the pour point results from a wax content. These copolymers are useful not only in petroleum lubricating oils having waxy pour points but also in fuel oils and diesel fuels and the like. The fluid hydrocarbons upon which these copolymers act are generally from paraffinic or naphthenic stocks. These copolymers may be used in conjunction with other additives, such as anti-oxidants, oiliness agents, detergents, and the like.

Compositions based on the copolymers of this invention dissolved in a wax-containing hydrocarbon liquid usually contain from 0.01% to 5% of the copolymer. There are some oils which are so susceptible to the action of the copolymers that a concentration of even 0.01% or 0.02% gives a practical depression of the pour point. Some oils advantageously may be treated with 5% or even more of one of these copolymers. This is particularly true in cases in which an increase in viscosity or an improvement in viscosity index is desired along with depression of pour point. In most cases concentrations of 0.05% to 2% of a copolymer are sufficient and highly effective for lowering the pour point and are preferred.

We claim:

1. A copolymer of an ester (A) of a saturated monohydric alcohol, ROH, in which R is an alkyl group having a chain of 16 to 18 carbon atoms, and an acid of the formula $$HOOCC(X)=CHCOOH$$

wherein X is a member of the class consisting of hydrogen, chlorine, and the methyl group, and an ester (B) of acrylic acid and a saturated monohydric alcohol, R'OH, wherein R' is an alkyl group of 6 to 10 carbon atoms, the proportion of (A) ester units to (B) ester units being between the ratios of $1:2n$, and $1:x$, where $x$ is determined by the relationship, $x=216/n^2$, $n$ being the number of carbon atoms in the longest straight chain of R'.

2. A copolymer of dioctadecyl maleate and $n$-dodecyl acrylate in a mole ratio between 1:24 and 1:1.5.

3. A copolymer of dioctadecyl fumarate and dodecyl acrylate in a mole ratio between 1:24 and 1:1.5.

4. A copolymer of dioctadecyl chloromaleate and dodecyl acrylate in a mole ratio between 1:24 and 1:1.5.

5. A copolymer of dihexadecyl maleate and dodecyl acrylate in a mole ratio between 1:24 and 1:1.5.

WILLIAM L. VAN HORNE.
LA VERNE N. BAUER.
HARRY T. NEHER.

REFERENCES CITED

The following references are of record in the file of this patent:

UNITED STATES PATENTS

| Number | Name | Date |
|---|---|---|
| 2,047,398 | Voss | July 14, 1936 |
| 2,129,662 | Barrett et al. | Sept. 3, 1938 |
| 2,286,251 | Arnold | June 16, 1942 |
| 2,366,517 | Gleason | Jan. 2, 1945 |
| 2,514,895 | Neher et al. | July 11, 1950 |
| 2,544,691 | Kugler et al. | Mar. 13, 1951 |